United States Patent

[11] 3,620,674

| [72] | Inventors | Philippe Renault<br>Neuilly Sur Seine;<br>Serge Falcon, Rueil Malmaison; Jean-Claude Chavin, Franconville; Andre Deschamps, Chatou, all of France |
|---|---|---|
| [21] | Appl. No. | 703,581 |
| [22] | Filed | Feb. 7, 1968 |
| [45] | Patented | Nov. 16, 1971 |
| [73] | Assignee | Institut Francais du Petrole, des Carburants et Lubrifiants<br>Hauts de Seine, France |
| [32] | Priorities | Feb. 13, 1967 |
| [33] | | France |
| [31] | | 94.761;<br>Mar. 30, 1967, France, No. 100.911 |

[54] PROCESS FOR REGENERATING VOLATILE BASES AND VOLATILE ACIDS FROM THE SALTS FORMED THEREWITH
19 Claims, 1 Drawing Fig.

[52] U.S. Cl. .................................................. 23/178,
23/2, 23/2.3, 23/150, 23/181
[51] Int. Cl. ........................................................ C01b 17/56,
C01b 31/20
[50] Field of Search............................................ 23/178,
193, 2, 150, 181, 2.3; 252/189, 193

[56] References Cited
UNITED STATES PATENTS

| 1,946,489 | 2/1934 | De Jahn.......................... | 23/178 S |
|---|---|---|---|
| 2,161,056 | 6/1939 | Johnstone et al. ............ | 23/178 S |
| 1,916,980 | 7/1933 | Horvitz.......................... | 23/178 S |
| 2,090,947 | 8/1937 | Oxley et al.................... | 23/193 |
| 2,106,446 | 1/1938 | Baehr et al.................... | 23/178 S |
| 2,139,375 | 12/1938 | Millar et al. .................. | 23/178 S |
| 2,161,055 | 6/1939 | Johnstone et al. ............ | 23/178 S |
| 2,176,441 | 10/1939 | Ulrich et al. .................. | 23/178 S |

FOREIGN PATENTS

| 349,287 | 5/1931 | England ....................... | 23/178 |

*Primary Examiner*—Oscar R. Vertiz
*Assistant Examiner*—Charles B. Rodman
*Attorney*—Craig, Antonelli, Stewart & Hill ABSTRACT: A two-stage process for regenerating volative bases B' and weak volatile acids A' from their salts which comprises contacting, in a first stage, the salt with an organic base B of low volatility to liberate the volatile base B' in a gaseous form and liberating the weak volatile acid A' in gaseous form in a second stage while generating the base B of low volatility in the liquid phase.

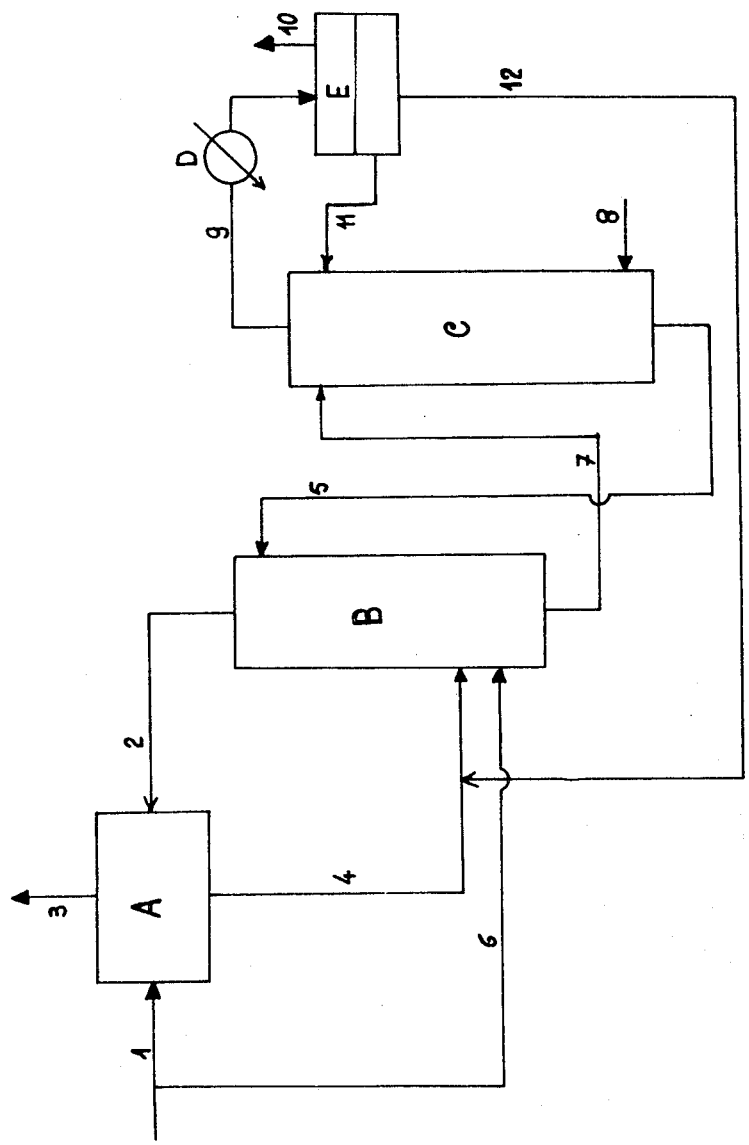

PROCESS FOR REGENERATING VOLATILE BASES AND VOLATILE ACIDS FROM THE SALTS FORMED THEREWITH

This invention relates to a new process for recovering volatile bases and weak volatile acids from their salts.

The process according to this invention is carried out in two stages. In a first stage generally conducted at moderate temperature, the salt is contacted with an organic base of low volatility. During this stage the volatile base is liberated in a gaseous form whereas the salt of the low volatile base is formed. In the second stage, conducted at a higher temperature than in the first stage and/or under a lower pressure, the salt formed in the first stage is decomposed by heat so as to liberate the weak volatile acid in a gaseous form and to regenerate the solution of said low volatile base, which may be reused in a subsequent run.

$A'$ and $B'$ being the volatile acid and base constituents respectively and $B$ the low volatile base, the base $B$ will be used in a proportion at least equimolecular with respect to the base $B'$ of the salt $A'B'$, and preferably in large excess of for instance 2 to 100 moles of base $B$ per mole of base $B'$ of the salt.

The aforementioned two stages are diagrammatically represented as follows:

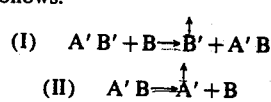

(I)   $A'B' + B \rightarrow B' + A'B$ (II)   $A'B \rightarrow A' + B$

These equations are not intended to show the relative proportions of acid $A'$ and base $B'$ in the salt $A'B'$ since, as a matter of fact when $A'$ is an acid of $n$ valence, $n$ salts can be derived therefrom according to the number of acid remainders (one, two or more) which are satisfied by base $B'$, and conversely the same remarks apply to the base $B'$. The process object of this invention has a very wide field of applicability. It can be used, for example, in all cases where it is intended to recover one of the components (or both) of a salt, which otherwise would be thrown away as useless.

A special field of interest for the applicability of this invention is regeneration of ammonia and its sulfite and bisulfite combinations.

There is, in fact, a well-known process for purifying sulfurous anhydride-containing smokes, which consists of injecting ammonia in the gaseous outflow and recovering a mixture of ammonium sulfite and bisulfite As there is only a small market for these products the manufacturing cost is essentially determined by the ammonia consumption.

A substantial improvement may be brought to this process by regenerating ammonia from the ammonium sulfite-bisulfite mixture and recovering sulfurous anhydride therefrom.

There will be described hereunder the principle of and conditions for carrying out such a treatment as one particular example of applicability of this invention.

This treatment consists of adding to the ammonium sulfite-bisulfite mixture, an organic base $B$, less volatile than the ammonia and capable of forming with the sulfurous anhydride a more stable combination than the ammonium sulfite or bisulfite, which is labile at a temperature higher than that at which the latter dissociate.

By heating at a temperature sufficient to decompose ammonium sulfite or bisulfite but insufficient to decompose the sulfite or bisulfite of base $B$, the ammonium sulfite or bisulfite dissociation equilibrium is displaced, according to the following reactions (applying to the case of a sulfite by way of example):

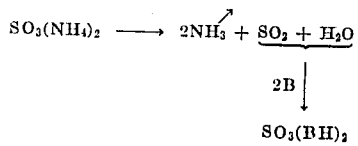

$$SO_3(NH_4)_2 \longrightarrow 2NH_3 + SO_2 + H_2O$$
$$\downarrow 2B$$
$$SO_3(BH)_2$$

As it is apparent, the total reaction corresponds to the above-stated reaction (I).

In most cases the operating temperature is lower than 100° C. when the reaction is conducted under atmospheric pressure (temperature range of for instance from 20° to 100° C.) The removal of ammonia can be favored by sweeping with an inert gas, for example with a part of the smoke subjected to the treatment, or by lowering the pressure.

The ammonia is drawn away and thus can be recycled whereas the sulfurous anhydride remains in a combined form with the organic base. The new sulfite or bisulfite is then decomposed, preferably at high temperature, usually higher than 110° C. under atmospheric pressure, for example 120°or 130° C., while regenerating the organic base and providing recoverable sulfurous anhydride. It is however, generally useless to proceed at a temperature higher than 170° C.

This corresponds to the second stage (II) of the reaction, diagrammatically represented as follows:

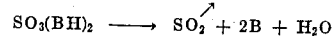

$$SO_3(BH)_2 \longrightarrow SO_2 + 2B + H_2O$$

The carrying away of the sulfurous anhydride can be effected by means of an inert gas or, preferably, by means of steam.

In the general case under consideration hereabove (reactions I and II) the organic base to be used according to the process of the invention is a compound containing at least one nitrogen atom in the molecule and having a normal boiling point preferably higher than 100° C. and more preferably higher than 150° C. and selected amongst the under-mentioned different groups of compounds (the compounds containing from 5 to 40 carbon atoms per molecule being preferred):

a. primary, secondary and tertiary aliphatic and cycloaliphatic amines.

b. primary, secondary and tertiary aromatic amines.

c. pyrrolines, pyrrolidines, piperidines and their corresponding hydrocarbyl substitution derivatives, wherein the hydrocarbyl group contains preferably from 1 to 10 carbon atoms.

d. the mono- or poly-alkanolamines preferably containing from 1 to 3 amino groups and 1 to 3 alcohol functions.

e. the aliphatic, cycloaliphatic or aromatic polyamines, preferably containing from 2 to 4 amine groups.

As nonlimitative examples of low volatile bases belonging to the above-mentioned groups (a) to (e), which can be used in the process according to this invention, are the following:

n-heptylamine, cyclohexylamine, trilaurylamine, dicyclohexylamine aniline, toluidines, xylidines piperidine, N butyl pyrrolidine, α-phenylpyrroline mono-, di- and tri-ethanolamines tri-isopropanolamine, methyldiethanolamine paraphenylenediamine, hexamethylenediamine, 1,4-cyclohexylenediamine 1,2,4-triaminobenzene.

The low volatile base will preferably be used in the form of a solution in an organic solvent of low volatility or in a mixture of solvents preferably selected amongst:

the lactames having for example from 5 to 7 carbon atoms in their cycle and preferably N- alkyl lactames with preferably an alkyl group of from 1 to 6 carbon atoms.

the amides complying with the general formula

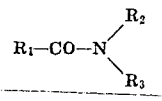

$$R_1-CO-N\begin{matrix}R_2\\R_3\end{matrix}$$

wherein $R_1$, $R_2$ and $R_3$ are either a hydrogen atom or a hydrocarbon monovalent radical, preferably containing from 1 to 10 carbon atoms, such as an alkyl, a cycloalkyl or an aryl radical.

the sulfoxides of the general formula R'—SO—R" and the sulfones of the general formula R'—SO$_2$—R", as well as their cyclic homologs.

In these two formulas R" and R' are hydrocarbon monovalent radicals, particularly alkyl, cycloalkyl or aryl radicals containing from 1 to 12 carbon atoms, and preferably alkyl radicals having from 1 to 3 carbon atoms. R' and R" may also form together a bivalent radical containing, for instance, from 3 to 10 carbon atoms.

the alcohols, polyols and amongst them, more particularly glycol, polyethylene glycols, polyalkylene glycols as well as the derivatives of any of these compounds such as the mono- or poly-ethers and/or esters of such compounds.

As example of solvents pertaining to these different groups, as stated above, are to be mentioned in a nonlimitative manner:

N-methylpyrrolidone, N-ethylpiperidone, dimethylformamide, dimethylacetamide, monomethylformamide, butyramide, dimethylsulfoxide, dimethylsulfone, tetramethylene sulfone, n-octanol, di- and tri-ethyleneglycols propyleneglycol, triethyleneglycol monomethyl ether, diethyleneglycol mono- and di-butylether, propyleneglycol carbonate, ethyleneglycol monobutyl ether acetate, polyethylene glycol having an average molecular weight of 400, polyethyleneglycolmonomethylether having an average molecular weight of 350.

It is also possible to use water as solvent of the amine although this is less desirable.

The solutions to be used in the process of this invention, i.e. the mixtures of one or more low volatile bases with one or more solvents, as hereabove stated, will advantageously contain from 1 to 50 percent and preferably from 10 to 20 percent by weight of low volatile base, these values being however not limitative.

The solutions may also contain up to 50 percent by weight of water or even more, although this is less preferred.

In some cases the base can be used without solvent, the latter being necessary only when using bases in a solid or highly viscous form.

As previously stated the two-stage process according to this invention may be used to decompose the salts formed by reaction of volatile inorganic or organic bases with volatile and weak inorganic or organic acids.

The volatile base B' present in the salt to be decomposed will be for instance ammonia or a primary, secondary or tertiary amine of low boiling point (preferably lower than 200° C. under a pressure of 760 mm. of Hg), or removable with steam, for instance monomethylamine, diethylamine, n-butylamine, n-hexylamine, n-octylamine, cyclohexylamine or aniline.

The only required limitation for base B' is that it must have a boiling point significantly lower than that of base B (preferably by at least 50° C. under a pressure of 760 mm. Hg).

As weak acids A' are preferred those which do not result in a too stable combination when reacted with the organic base B of low volatility.

By way of nonlimitative examples are to be mentioned the following compounds:

sulfhydric acid H$_2$S, cyanhydric acid HCN, formic acid HCOOH, acetic acid CH$_3$COOH, carbonic anhydride CO$_2$, sulfurous anhydride SO$_2$, fluorhydric acid HF.

Thus according to this invention, the following compounds can be treated: ammonium sulfides cyanide, formate, acetate, carbonates, sulfites or fluoride, dimethylamine carbonate.

The process according to this invention can be carried out in any apparatus adapted for a two-stage reaction.

Thus, for the first stage, there can be used a column wherein is introduced the starting salt to be decomposed as well as the base B of low volatility.

It must be specified that, whatever may be the apparatus used, said salt may be either in a solid state (either dry or in suspension into a liquid) or in a dissolved state, for instance in the form of an aqueous solution of ammonium sulfite or bisulfite.

The apparatus wherein is effected the second stage of the process may be identical or not to that in which is carried out the first stage.

The process of this invention may be carried out either as a batch process or as a continuous process. In the first case, reactions (I) and (II) can be carried out in the same apparatus.

Whatever may be the selected method of operation (i.e. as a batch process or as a continuous process), the pressure and temperature conditions prevailing during each of these two stages will be so selected as:

1. to recover the volatile base B' substantially free from volatile acid A' in the first stage, and
2. to regenerate in the second stage, the solution of base B of low volatility by substantially quantitative liberation of the volatile acid A' to which said base was combined, without noticeable liberation of base B.

At equal pressure, for instance, the second stage will be carried out at a temperature exceeding that of the first stage by at least 10° C.

Temperatures, themselves, are of course dependent on the pressure and the kind of salt subjected to the treatment according to the invention. Thus, in the case, for example, ammonium sulfide (A'=H$_2$S; B'=NH$_3$) the ambient temperature or a slightly higher temperature under atmospheric pressure will be sufficient in most cases for carrying out the first stage.

In the case of sulfite and/or bisulfite it is necessary to slightly increase the temperature, but in most cases to a value lower than 100° C. (for instance from 40° to 100° C.). Still in the case of ammonium sulfite and/or bisulfite the liberation of SO$_2$ in the second stage occurs at a temperature generally higher than 100° C. under atmospheric pressure (for example in the range of 110°–150° C.). It is also possible to operate under a pressure of 0.2 to 5 atmospheres within the above-mentioned temperature conditions.

The heat supply in any of the two stages and more particularly in the second stage can be effected in any conventional manner, for instance by means of steam injection, which may also be used for carrying away the base or more particularly the volatile acid. The invention is further illustrated by the accompanying drawing diagrammatically showing a unit of treatment by ammonia of sulfurous anhydride-containing smokes. The so-obtained ammonium sulfite and bisulfite mixture is treated according to the process of the invention so as to recover ammonia and, if so desired, the sulfurous anhydride eliminated in the purification treatment of the smokes.

The smoke containing the sulfurous anhydride is conveyed through pipe 1 to chamber A which diagrammatically represents the device for purifying the smoke by contacting the same with ammonia supplied from pipe 2 of the regeneration device object of the invention. The purified smoke is conveyed through duct 3 towards the chimney. The ammonium sulfite and bisulfite mixture either dry or in aqueous solution is conveyed through duct 4 to the ammonia regeneration column B of the type with filling or with perforated plates, at the top of which is injected, through duct 5, a solution of triethanolamine in triethyleneglycol monoethyl ether. The temperature is of about 95° C. at the bottom of the column and of 60° C. at the top. One part of the smoke to be treated is compressed and injected through duct 6 at the bottom of the column as sweeping gas. It escapes at the top, charged with ammonia and steam and is recycled to A through duct 2.

The solution of triethanolamine sulfite and bisulfite in triethyleneglycol monoethyl ether is withdrawn from the bottom of column B and conveyed through duct 7 to column C identical to B, heated to 120° C. at the bottom of which steam is injected through duct 8. The solvent containing the regenerated triethanolamine is withdrawn from the bottom of the column and brought back through duct 5 to column B. The steam carrying along therewith sulfurous anhydride, small amounts of solvents and eventually traces of ammonia, which escapes at the top of the column, is conveyed through duct 9 and, after passage through the cooler D, in the condenser E. The sulfurous anhydride is separated by duct 10. The condensed water, containing solvents carried along therewith, dissolved sulfurous anhydride and a small amount of ammonium bisulfite is partly recycled in column C through duct 11, the remainder being brought back to column B through duct 12.

Of course the unit, as illustrated in the drawing, may be used to purify smokes or gases which contain not only sulfurous anhydride but also acid compounds such as, for example, $H_2S$ and/or HCN (in addition to or instead of the sulfurous anhydride).

The process for recovering volatile bases and acids itself, which is the object of the invention, is carried out in apparatuses B and C.

It is obvious that the unit formed by these two apparatuses and their connecting parts may also be used for the treatment of other salts than sulfites and bisulfites whose origin is different. The following nonlimitative examples illustrate the invention:

EXAMPLE 1

Into 100cc. of triethylene glycol monoethyl ether having a 10 percent by weight water content, are introduced 8.6 g. of an ammonium sulfite-bisulfite mixture ($SO_2 = 8 \cdot 10^{-2}$ mole, $NH_3 = 12 \cdot 10^{-2}$ mole) and 12 g. of triethanolamine ($8.05 \cdot 10^{-2}$ mole).

The resulting solution is heated to 95° C. into a column at the bottom of which nitrogen is injected (100 liters per hour). After 30 minutes, the totality of ammonia has been carried away without substantial removal of sulfurous anhydride.

The solution is then brought to 120° C. and subjected to distillation with steam (100 liters per hour). After 10 minutes all of the sulfurous anhydride was carried away.

The respective amounts of nitrogen and steam used for carrying away the ammonia and the sulfurous anhydride are those required only for a batch process. It is obvious that in the case of a continuous operation and with countercurrent the required feeding rates are much lower. This remark is also valid for the following examples.

EXAMPLE 2

Into 100 cc. of tetramethylene sulfone are introduced 22.5 g. of triethanolamine (0.150 mole) and 25 cc. of an aqueous solution of neutral ammonium sulfite ($SO_2 = 0.075$ mole, $NH_3 = 0.150$ mole). Said solution had been obtained by treatment of an industrial gas having a 4 percent by weight content of $SO_2$, the remaining part consisting of nitrogen and oxygen, by means of ammonia at a temperature of 20° to 60° C.

The resulting solution of ammonium sulfite in said sulfone is heated to 90° C. and subjected to a treatment with nitrogen (100 liters per hour) After a few minutes all the ammonia has been carried away whereas the sulfurous anhydride remains in the combined form of triethanolamine sulfite.

The solution is then brought to 120° C. and subjected to a distillation with steam. After a few minutes all the sulfurous anhydride has been carried away. The so-regenerated solution of triethanolamine in the sulfone may be used for treatment of a new ammonium sulfite charge.

Equivalent results are obtained by use of nitrogen as agent for carrying away $SO_2$.

EXAMPLES 3, 4 and 5

Example is repeated except that tetramethylene sulfone is replaced by other solvents such as N-methylpyrrolidone (example 3), dimethylformamide (example 4) and propyleneglycol carbonate (example 5). Moreover, in example 4, triethanolamine is replaced by tri-isopropanolamine. Of course the amounts of solvent and of amine were unchanged.

All other conditions being identical to those of example 2, substantially the same results as in this example are obtained.

EXAMPLE 6

Into 100 cc. of triethyleneglycol monoethyl ether are introduced 22.5 g. of triethanolamine (0.150 mole) and 25 cc. of an aqueous solution of ammonium acetate (0.150 mole).

The mixture is brought to 60° C. and a nitrogen stream is passed there through. In a few minutes all of the ammonia is carried away. The solution is then brought to 100° C. and subjected to a distillation with steam. The acetic acid is carried away and the triethanolamine is regenerated.

EXAMPLE 7

Into 100 cc. of an aqueous solution of diethanolamine at a 20 percent by weight concentration are introduced 10 cc. of an aqueous solution containing 680 g. per liter of $S(NH_4)_2$. The ammonia is eliminated by bubbling nitrogen therethrough at 60° C. The remaining diethanolamine sulfide is then regenerated by heating to 130° C. under a pressure of 1.2 kg./cm.$^2$. The regenerated solution can be reused for the treatment of a new amount of ammonium sulfide.

EXAMPLE 8

Into 50 cc. of a diethylene glycol solution with a 5 percent by weight triethanolamine content, are introduced 8 cc. of an aqueous solution of $F_2HNH_4$ at a concentration of 500 g. per liter. The mixture is brought to 80° C. and the liberated ammonia is carried away by means of a nitrogen stream. The hydrofluoric acid is separated from the alkanolamine by heating to 120° C. and carrying away by means of a light nitrogen stream.

EXAMPLE 9

Nine g. of methylamine carbonate are introduced into 100 cc. of dimethylsulfoxide containing 7 percent by weight of monoethanolamine. The solution is maintained at 30° C.; the methylamine is separated by means of nitrogen bubbling. The monoethanolamine solution is then regenerated by heating to 70° C. and bubbling therethrough nitrogen, which carries away the carbonic anhydride.

The preceding examples can be repeated with like success when using any one of the reactants and any one of the operating conditions hereabove enumerated. In a general manner the two stages of the process will be conducted at a temperature comprised between 10° and 250° C., preferably between 25° and 200° C., under a pressure of from 0.1 to 30 atmospheres, preferably from 0.5 to 5 atmospheres, a higher temperature and/or a lower pressure being selected for the second stage than for the first stage.

What is claimed as this invention is:

1. A two-stage process for regenerating volatile bases B', selected from the group consisting of ammonia, monomethylamine, diethylamine and n-butylamine, and weak volatile acids A', selected from the group consisting of sulfhydric acid (hydrogen sulfide), cyanhydric acid (hydrogen cyanide), formic acid, acetic acid, carbonic anhydride (carbon dioxide), sulfurous anhydride (sulfur dioxide) and fluorhydric acid (hydrogen fluoride), from their salts A' B', which consists essentially of contacting, in a first stage, the salt with an organic base B of low volatility, selected from the group consisting of pressure,] aliphatic, cycloaliphatic and aromatic mono- and polyamines, mono- and polyalkanolamines, pyrrolines, pyrrolidines and piperidines, in the liquid phase, at a pressure between about 0.2 and 5 atmospheres and a temperature between about 20° and 100° C., in order to liberate the volatile base B' in a gaseous form, and liberating the weak volatile acid A' in a gaseous form in a second stage, at a pressure of between about 0.2 and 5 atmospheres, at a temperature of between about 70° and 200° C., and at least 10° C. above that of the first stage, while regenerating the base B of low volatility in the liquid phase.

2. A process according to claim 1 wherein the base B contains from 5 to 40 carbon atoms per molecule.

3. A process according to claim 1, wherein said process is carried out with the use of a solvent selected from the group consisting of water, lactames amides, sulfoxides, sulfones, alcohols, polyols, polyalkleneglycols, mono- and polyethers of polyols and of polyalkyleneglycols and ethers-esters of polyols and of polyalkylene glycols.

4. A process according to claim 3, wherein the organic base B of low volatility constitutes from 1 to 50 percent by weight of the solution.

5. A process according to claim 4 wherein the organic base B of low volatility represents 10 to 20 percent by weight of the solution.

6. A process according to claim 1, wherein the salt is ammonium sulfite obtained by the reaction of ammonia with a gaseous mixture containing sulfurous anhydride at a temperature of 20°–60° C. and wherein the recovered ammonia is recycled to the salt-manufacturing zone.

7. A process according to claim 6 wherein the organic base of low volatility is triethanolamine and the solvent is triethylene glycol monoethyl ether.

8. A process according to claim 6, wherein a portion of the starting gaseous mixture, containing sulfurous anhydride, is swept through the first stage during said stage of the process so as to facilitate the liberation of the volatile base B'.

9. A process according to claim 1, wherein to facilitate the liberation of the volatile base B', nitrogen is swept through the first stage during said stage of the process.

10. A process according to claim 1, wherein, during the second stage stream is swept through said second stage to facilitate the liberation of the weak volatile acid.

11. A process according to claim 1, wherein 1 to 100 moles of base B are used per mole of base B' in a combined form in the salt.

12. A process according to claim 1, wherein the salt A' B' is an ammonium sulfide, cyanide, formate, acetate, carbonate, bicarbonate, sulfite, bisulfite or fluoride.

13. The process of claim 1, wherein the second stage is conducted at a temperature of about 110° to 170° C.

14. The process of claim 6, wherein the salt of A' B' is ammonium sulfite and the base B of low volatility is triethanolamine which has been added to the solvent tetramethylene sulfone.

15. The process of claim 14, wherein the solvent is N-methyl-pyrrolidone.

16. The process of claim 14, wherein the solvent is propyleneglycol carbonate.

17. The process of claim 6, wherein the salt of A' B' is ammonium acetate and the base B of low volatility is triethanolamine which has been added to the solvent tetramethylene sulfone.

18. The process of claim 6, wherein the salt of A' B' is $F_2HNH_4$ and the base B of low volatility is triethanolamine which has been added to the solvent diethylene glycol.

19. The process of claim 1, wherein said salts are the reaction of products of volatile bases B' and weak volatile acids A'.

* * * * *